US006756587B1

(12) United States Patent
Bateman et al.

(10) Patent No.: US 6,756,587 B1
(45) Date of Patent: Jun. 29, 2004

(54) TIME OF FLIGHT MASS SPECTROMETER AND DUAL GAIN DETECTOR THEREFOR

(75) Inventors: Robert H. Bateman, Knutsford (GB); Anthony J. Gilbert, Chapel-en-le-Frith (GB); Thomas O. Merren, Altrincham (GB); John B. Hoyes, Stockport (GB); Jonathan C. Cottrell, Altrincham (GB)

(73) Assignee: Micromass UK Limited, Manchester (GB)

( * ) Notice: Subject to any disclaimer, the term of this patent is extended or adjusted under 35 U.S.C. 154(b) by 0 days.

(21) Appl. No.: 09/381,778

(22) PCT Filed: Jan. 25, 1999

(86) PCT No.: PCT/GB99/00248

§ 371 (c)(1), (2), (4) Date: Feb. 22, 2000

(87) PCT Pub. No.: WO99/38190

PCT Pub. Date: Jul. 29, 1999

(30) Foreign Application Priority Data

| | | |
|---|---|---|
| Jan. 23, 1998 | (GB) | 9801565 |
| Feb. 27, 1998 | (GB) | 9804286 |
| May 20, 1998 | (GB) | 9810867 |
| Jun. 18, 1998 | (GB) | 9813224 |

(51) Int. Cl.[7] .......... B01D 59/44

(52) U.S. Cl. .......... 250/287; 250/283

(58) Field of Search .......... 250/283, 287, 250/282

(56) References Cited

U.S. PATENT DOCUMENTS

| | | | | |
|---|---|---|---|---|
| 3,965,354 A | | 6/1976 | Fletcher et al. | |
| 4,472,631 A | * | 9/1984 | Enke et al. | 250/281 |
| 4,490,806 A | | 12/1984 | Enke et al. | |
| 4,691,160 A | | 9/1987 | Ino | |
| 5,070,240 A | | 12/1991 | Lee et al. | |

(List continued on next page.)

FOREIGN PATENT DOCUMENTS

| | | |
|---|---|---|
| GB | 2300513 | 11/1996 |
| JP | 5-509437 | 12/1993 |

(List continued on next page.)

OTHER PUBLICATIONS

Abstract, Reference 1—JP 01-298637, A (1989); 5-pages. Document Bibliography and Abstract; JP 1166456; Publication Date Jun. 30, 1989; Patent Application No. JP 19870324082 19871223; (5 pages).

(List continued on next page.)

*Primary Examiner*—John R. Lee
*Assistant Examiner*—Anthony Quash
(74) *Attorney, Agent, or Firm*—Alix, Yale & Ristas, LLP

(57) ABSTRACT

An ion detector (27) for use in a time-of-flight mass spectrometer (1) is disclosed. The ion detector (27), which has an extended dynamic range, comprises at least one microchannel plate electron multiplier (42, 32) together with first and second collection electrodes (36, 38; 39). The second collection electrode (36, 38) is arranged such that in receives more electrons per ion entering the ion detector (27) than the first collection electrode (39). In one embodiment the collection electrodes (36, 38; 39) are formed in an array consisting of a larger plate-like collection electrode (36, 38) and a smaller plate-like collection electrode (39). In an alternative embodiment a second microchannel plate electron multiplier is arranged between the first collection electrode (46) and the second collection electrode (47). In this embodiment the first collection electrode consists either of a grid electrode (42) or more preferably of a wire electrode, and the second collection electrode consists of a plate-like electrode (43).

21 Claims, 3 Drawing Sheets

U.S. PATENT DOCUMENTS

| | | | | | |
|---|---|---|---|---|---|
| 5,206,506 | A | * | 4/1993 | Kirchner | 250/281 |
| 5,428,357 | A | | 6/1995 | Haab et al. | |
| 5,463,219 | A | | 10/1995 | Buckley et al. | |
| 5,463,220 | A | * | 10/1995 | Young et al. | 250/288 |
| 5,563,410 | A | * | 10/1996 | Mullock | 250/288 |
| 5,644,220 | A | * | 7/1997 | Urs et al. | 324/71.3 |
| 5,712,480 | A | * | 1/1998 | Mason | 250/287 |

FOREIGN PATENT DOCUMENTS

| | | |
|---|---|---|
| JP | 6-501130 | 2/1994 |
| SU | 851549 | 7/1981 |
| WO | WO 94/28631 | 12/1994 |
| WO | WO 95/00236 | 1/1995 |
| WO | WO 98/21742 | 5/1998 |

OTHER PUBLICATIONS

Document Bibliography and Abstract; JP 7021971, Publication Date Jan. 24, 1995; Patent Application No. JP 19930186814 19930630; (9 pages).

Stephan, Zehnpfenning and Benninghoven, J. of Vac. Sci. Technol. A 1994, vol. 12 (2), pp. 405–410.

Rockwood et al., Abstracts, Pittcon 1997, Atlanta, GA, Mar. 1997, Paper No. 733.

Kristo and Enke, , Rev. Sci. Instrum. 1988, vol. 59, (3), pp. 438–442.

* cited by examiner

TIME OF FLIGHT MASS SPECTROMETER AND DUAL GAIN DETECTOR THEREFOR

CROSS-REFERENCE TO RELATED APPLICATIONS

This is the national stage of International Application No. PCT/GB99/00248 filed Jan. 25, 1999.

BACKGROUND OF THE INVENTION

This invention relates to a time-of-flight mass spectrometer and its associated ion detection system. It provides apparatus for detecting ions in a time-of-flight mass spectrometer, and methods of operating that apparatus, which result in improved performance at a lower cost when compared with prior spectrometers.

In a time-of-flight mass spectrometer, a bunch of ions enters a field-free drift region with the same kinetic energy and the ions temporally separate according to their mass-to-charge ratios because they travel with different velocities. Ions having different mass-to-charge ratios therefore arrive at a detector disposed at the distal end of the drift region at different times, and their mass-to-charge ratios are determined by measurement of their transit time through the drift region.

Prior detectors for time-of-flight mass spectrometers comprise an ion-electron converter followed by an electron multiplying device. In some embodiments, ions strike a surface of the multiplying device to release electrons and a separate converter is not provided. Because the detector must respond to ions leaving the whole exit aperture of the drift region, it is conventional to use one or more microchannel plate electron multipliers as the multiplying device. A collector electrode is disposed to receive the electrons produced by the microchannel plates and means are provided to respond to the current flow so generated and produce an output signal. The chief difference between such a detector and the similar device conventionally used with magnetic sector, quadrupole or quadrupole ion-trap spectrometers is the electronic signal processing, which must produce signals indicative of the transit time of the ions as well as the number arriving in any particular time window (corresponding to one or more mass-to-charge ratios). This data must be generated and read out before the next bunch of ions can be admitted into the drift region, so that detector speed is an important determinant of the repetition rate, and hence the sensitivity, of the entire spectrometer.

The earliest detectors for time-of-flight spectrometers comprised a DC amplifier connected to the collector electrode and an analogue-to-digital converter (ADC) for digitizing the output of the amplifier. Usually, this arrangement was used with time-slice detection whereby the amplifier was gated to respond only to ions arriving within a certain time window (typically corresponding to one mass unit). The time window was moved (relative to the time of entrance of ions into the drift region) during repeated cycles of operation so that a complete mass spectrum was eventually recorded. An improvement involved the use of several amplifiers and ADC's arranged to simultaneously record a different time window. Nevertheless, many cycles of the spectrometer are still required to record a complete mass spectrum and the repetition rate of the spectrometer is severely limited by the time taken for the analogue-digital conversion in each cycle. Digital transient recorders (for example, as described in U.S. Pat. Nos. 4,490,806, 5,428,357 and PCT applications WO94/28631 and WO95/00236) have been devised to efficiently process the digital data produced by the ADC, but, particularly in the case of time-of-flight mass analyzers for the analysis of ions from continuous (as opposed to pulsed) ion sources, these do not represent a cost-effective solution to the problem of achieving a high repetition rate.

An alternative detection system for time-of-flight mass spectrometers is based on ion counting. In these methods, a signal due to a single ion impact on the detector is converted to a digital boolean value, "true" (which may be represented by a digital "1") in the case of an ion impact, or "false" (e.g, a digital "0") if there has been no ion impact. Various types of timers and/or counters are then employed to process the digital data produced. For example, a counter associated with a particular time window may be incremented whenever a signal is generated in that time window. Alternatively, the output of a timer, started when an ion bunch enters, may be stored in a memory array whenever the detector generates a "true" signal. The advantage of an ion-counting detector over an analogue detector is that variations in the output signal of the electron multiplier due to a single ion impact, which may be ±50% or more, are effectively eliminated because each signal above the noise threshold is treated identically. Further, an ion counting detector does not suffer from the additional noise inevitably produced by the ADC incorporated in an analogue detector system, and is also faster in operation. Consequently, the contribution of noise to the overall ion count is reduced and a more accurate ion count is achieved, particularly in the case of small numbers of ions. The disadvantage is that the digital signal representing an ion impact must be processed very quickly, before the next ion arrives at the detector, if that ion is to be detected. In practice, all detectors have a deadtime immediately following an ion impact, during which they cannot respond to an ion impact. This limits the number of ions which can be detected in a given time, so that a dynamic range of the detector is also limited. Corrections can be made to the detector output to compensate for the effects of deadtime (see, for example, Stephen, Zehnpfenning and Benninghoven, J. Vac. Sci. Technol. A, 1994 vol 12 (2) pp 405–410), and in corresponding EP patent application claiming priority solely from GB 9801565.4 filed Jan. 23, 1998 (Agents Ref: 80.85.67750/004), but even when such corrections are carried out the detector dynamic range still effectively reduces the performance of a time-of-flight mass spectrometer with such a detector.

An improved ion-counting detector for time-of-flight mass spectrometry has been described in general terms by Rockwood at the 1997 Pittsburgh Conference, Atlanta, Ga. (paper No 733), and is available commercially from Sensar Larsen-Davis as the "Simulpulse" detector. According to information published by Sensar Larson-Davis it comprises a large number of individual equal-area anodes, each of which is provided with a digital pulse generating circuit which is triggered by the arrival of an ion at its associated anode. The anodes are disposed in a wide-area detector so that they are all equally likely to be struck by an ion exiting from the drift region. Consequently, simultaneous (or near-simultaneous) ion strikes are most likely to occur on different electrodes and the effect of detector deadtime is greatly reduced. The data from each of the anodes is summed into an 8-bit digital word representative of the ion intensity at any particular time, and the value of that word and its associated time is stored in a digital memory. However, such a detector is obviously complicated and expensive to manufacture.

An electron multiplier ion detector for a scanning mass spectrometer which has two modes of operation to extend its dynamic range is disclosed by Kristo and Enke in Rev. Sci.

Instrum. 1988 vol 59 (3) pp 438–442. This detector comprises two channel type electron multipliers in series together with an intermediate anode. The intermediate anode was arranged to intercept approximately 90% of the electrons leaving the first multiplier and to allow the remainder to enter the second multiplier. An analogue amplifier was connected to the intermediate anode and a discriminator and pulse counter connected to an electrode disposed to receive electrons leaving the second multiplier. The outputs of the analogue amplifier and pulse counter were electronically combined. A protection grid was also disposed between the multipliers. At high incident ion fluxes, the output signal comprised the output of the analogue amplifier connected to the intermediate anode. Under these conditions a potential was applied to the protection grid to prevent electrons entering the second multiplier (which might otherwise cause damage to the second multiplier). At low ion fluxes, the potential on the protecting grid was turned off and the output signal comprised the output of the pulse counter. In this mode the detector operated in the single ion counting mode. In this way the detector was operable in a low sensitivity analogue mode using the intermediate anode and a high sensitivity ion counting mode using both multipliers and the pulse counter, so that the dynamic range was considerably greater than a conventional detector which use only one of these modes.

Other prior art teaching of electron multipliers with means for extending the dynamic range includes a simultaneous mode (i.e., pulse counting and analogue) electron multiplier taught in U.S. Pat. No. 5,463,219. U.S. Pat. No. 4,691,160 teaches a discrete dynode electron multiplier having two final collector electrodes of different areas, each connected to a separate analogue amplifier and selectable by means of a manually operated switch. Soviet Inventors Certificate SU 851549 teaches the disposition of a control grid between two channelplate electron multipliers, the potential on which can be adjusted to control the gain of the assembly. GB patent application 2300513 A teaches a similar control grid disposed between certain dynode sheets in an electron multiplier comprising a stack of such sheets, and which is especially suitable for a photomultiplier tube. Prior art disclosed in U.S. Pat. No. 4,691,160 also comprises a continuous dynode electron multiplier having two collector electrodes, one of which is capable of receiving electrons from a dynode disposed prior to the final dynode so that the multiplier has less gain.

Co-pending PCT patent application claiming priority from GB9801565.4, GB9804286.4, GB9810867.3 and GB9813224.4 and filed simultaneously herewith (Agents Ref: 80.85.67901/003) teaches a time-of-flight mass spectrometer having an ion-counting channelplate detector with two or more collection electrodes of unequal areas and means for automatically selecting data from the most appropriate electrode according to the ion flux at different mass to charge ratios. In this way the dynamic range of the detector is extended by switching to data from a smaller electrode whenever the data from a larger electrode is likely to be inaccurate due to detector deadtime.

SUMMARY OF THE INVENTION

It is an object of the present invention to provide a time-of-flight mass spectrometer and a detector therefor, which has a greater dynamic range than most prior apparatus and which is cheaper to manufacture than prior spectrometers and detectors of equivalent performance. It is a further object to provide methods for operating such a spectrometer and detector.

According to a first aspect of the present invention there is provided a time-of-flight mass spectrometer.

In a preferred embodiment a second electron multiplying means may be provided between the first collection electrode and the second collection electrode to receive electrons which are not collected on the first collection electrode and to generate a greater number of electrons per ion entering the detector at the second collection electrode than at the first collection electrode.

Alternatively, both collection electrodes can be disposed to receive secondary electrons from a single electron multiplying means but the first electrode may have a smaller effective area than the second collection electrode so that the second collection electrode receives more electrons per ion entering the detector.

The term "effective area" means that area of a collection electrode which actually receives the secondary electrons. Thus the first collection electrode may comprise a grid-like electrode of smaller effective area than the second collection electrode.

In an alternative embodiment, the grid-like electrode(s) may be replaced with at least one, preferably a single, wire electrode.

The signal processing means associated with each of the collection electrodes may comprise an analogue or a digital (i.e, pulse-counting) system. Preferably, both signal processing means are digital, but in a less preferred embodiment one may be digital and the other may be analogue.

Analogue signal processing means may comprise a fast analogue amplifier followed by an A-D converter which outputs a digital signal to the memory means on receipt of a clock pulse.

Pulse-counting signal processing means may comprise a discriminator which generates a digital "true" signal to the memory means in response to the arrival of secondary electrons at the collection electrode in the period immediately preceding a clock pulse.

Typically, a digital signal processing means is used in association with the second collection electrode to provide the maximum sensitivity. A pulse-counting system of this nature unavoidably suffers from dead-time errors such that immediately following triggering of the discriminator the discriminator is unable to respond for a time, and co-pending PCT patent application claiming priority from GB9801565.4, GB9804286.4, GB9810867.3 and GB9813224.4 and filed simultaneously herewith (Agents Ref: 80.85.67901/003) teaches apparatus and methods for minimizing this problem in a similar detector system for a time-of-flight mass spectrometer.

Preferred embodiment of the memory means of the invention may comprise RAM associated with a suitably programmed digital computer or microprocessor. Thus, a spectrometer cycle is started each time a bunch of ions enters the drift region. In the case of an analogue signal processing means, a clock generator may cause the signal processing means to store the digital output of signal processing means in the memory means at a series of transit times corresponding to the ticks of the clock generator during that spectrometer cycle.

After all the ions of interest have travelled through the drift region the spectrometer cycle is terminated, a new bunch of ions is generated and a new cycle is started. Data at each clock tick from this and subsequent cycles may then be added to the data previously stored in the memory means for the same transit time value.

In the case of a pulse-counting detector a similar arrangement may be adopted, storing for example, a digital "1" at the clock tick immediately following the triggering of the fast discriminator by an ion arrival at the associated collection electrode and accumulating valves at corresponding transit times in subsequent detector cycles. Alternatively, memory may be conserved by storing only each transit time at which an ion triggers the fast discriminator.

In accordance with the preferred embodiment of the invention the output means is operative to determine the quantity of ions entering the detector at one or more transit times subsequent to the completion of at least one, and more usually many, spectrometer cycles.

The number of cycles during which acquisition takes place will be dependent on the rate at which the mass spectrum is changing and the capacity of the memory means. For example, in the case of a TOF spectrometer used for monitoring fast chromatographic peaks the repetition rate may be 10 kHz and data may be stored for about 0.5 seconds (ie, approximately 5,000 spectrometer cycles) in the memory means before being processed by the output means. Longer time periods and lower repetition rates are more typical for MALDI TOF spectrometers.

Once the data from the desired number of spectrometer cycles has been acquired, the output means may generate mass spectral data in the form of the quantity of ions entering the detector at each of one or more transit times.

The output means preferably uses the data associated with the second collection electrode (or the data associated with both the first and second collection electrodes) in order to obtain the maximum sensitivity.

However, data associated with the second electrode may be unreliable at certain transit times if the number of ions entering the detector at a particular transit time exceeds a certain limit, for example because of detector dead-time in the case of pulse-counting signal processing means or because of saturation of the A-D converter in an analogue signal processing means. In such circumstances the output means may use data from the first collection electrode alone, which data is less likely to suffer from deadtime or saturation problems.

Conveniently, a decision on whether data from the second collection electrode is reliable at any given transit time is made from an examination of the data from the first collection electrode which has been stored in the memory means at the relevant transit time. The relative gains of the detector system of the collection electrodes and their associated signal processing means is known (either by experimental calibration or from the ratio of the areas of different sized collection electrodes) so that a threshold output level may be set in relation to the output of the signal processing means associated with the first collection electrode above which data associated with the second collection electrode should not be used.

Preferably the output means comprises a suitably programmed digital computer.

According to a second aspect of the present invention there is provided a method of time-of-flight mass spectrometry.

It will be appreciated that according to the invention and in contrast to the prior art of U.S. Pat. No. 5,463,219 it is not necessary to provide fast hardware to examine the signals generated by the first collection electrode while the data is being acquired. Instead, the decision as to whether data associated with the second collection electrode is valid is made once all the data from a plurality of ion bunches has been stored in the memory means. Consequently the speed at which data from the collection electrodes can be stored in the memory means is increased. This is especially important in the case of a time-of-flight spectrometer if the rate of generation of ion bunches, and hence the sensitivity of the spectrometer, is not to be degraded. Prior types of dual mode electron multipliers (e.g, that described in U.S. Pat. No. 5,463,219) intended for scanning mass spectrometers require hardware for monitoring the low-gain output signal in order to activate some means of preventing damage to the high-gain section of the multiplier when the ion beam flux exceeds a certain value. However, with a time-of-flight spectrometer this situation does not arise so readily because the number of ions arriving in each bunch will generally be far less than the number likely to cause damage to the multiplier. These prior types of dual-made multipliers are unsuited to use with a time-of-flight mass spectrometer because the presence of the protection system reduces the rate of data acquisition. The present inventors have realized that the limitation on dynamic range in the case of a time-of-flight detector is more likely to be imposed by the limited dynamic range of a sufficiently fast A-D converter, or the dead-time of a pulse-counting system, and not by the possibility of saturation of or damage to the multiplier itself. Thus, the present invention overcomes the limitations of prior dual-mode detectors when used for time-of-flight mass spectroscopy by storing data from the collection electrodes directly in the memory means and requiring no additional real-time processing or slow electronic hardware, and therefore, provides a detector with extended dynamic range which does not require the repetition rate of the spectrometer to be reduced.

Preferred variations on the method will be apparent from the discussion presented above in respect of the apparatus of the invention.

BRIEF DESCRIPTION OF THE DRAWINGS

Various embodiments of the invention will now be described, by way of example only, and with reference to the accompanying drawings in which.

DETAILED DESCRIPTION OF THE PREFERRED EMBODIMENTS

Figure 1:
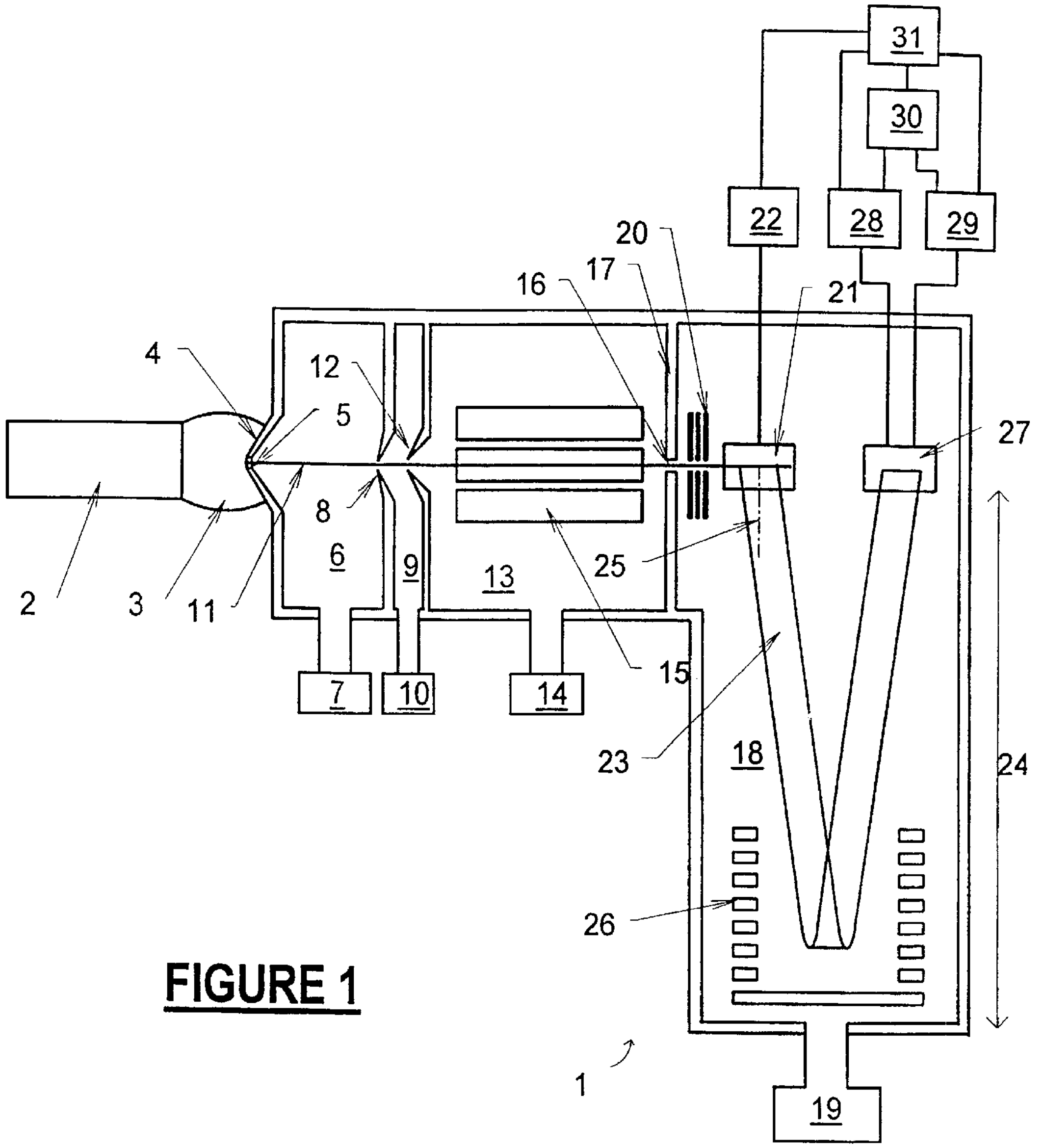
FIG. 1 is a schematic drawing of an ICP mass spectrometer.

Referring first to FIG. 1, an ICP mass spectrometer is generally indicated by 1 comprises an ICP torch 2 which generates a plasma 3. As in conventional ICP mass spectrometers a sample to be analyzed may be introduced into the torch 2 entrained in the torch gas supplies (not shown). Ions characteristic of such a sample are generated in the plasma 3. The torch 2 is disposed adjacent to a sampling cone 4 which comprises an orifice 5 through which at least some of the ions generated in the plasma 3 may enter a first evacuated chamber 6 which is pumped by a first pump 7. In agreement with conventional practice there is provided a skimmer 8 which cooperates with the sampling cone 4 to provide a nozzle-skimmer interface. An additional stage of pumping is provided by a second pump 10 connected to a second evacuated chamber 9. Ions from the plasma 3 exit from the skimmer 8 along an axis 11, pass through the second evacuated chamber 9 and exit through a third evacuated chamber 13 through an orifice in a conical extraction lens 12 which forms part of the boundary wall between the chambers 9 and 13. The third chamber 13 is evacuated by a third pump 14. In accordance with the teachings of EP patent application 0813228 a hexapole rod assembly 15 (containing gas at a pressure of about $10^{-2}$ torr)is provided in the third evacuated chamber 13 to reduce interferences from unwanted species and reduce the energy spread of ions.

After passing through the rod assembly 15 ions pass through an orifice 16 in a wall 17 which divides the third evacuated chamber 13 from a fourth evacuated chamber 18 which contains a time-of-flight mass analyzer. A vacuum pump 19 maintains the pressure in the chamber 18 at $10^{-6}$ torr or better. On entering the evacuated chamber 18 the ions pass through an electrostatic focusing lens 20 and enter an ion pusher 21, electrodes in which are fed with pulses from a pulse generator 22 in such a way that bunches of ions are repeatedly ejected parallel to an axis 25 into a drift region 24. In a general sense, therefore, items 1–24 comprise an ion source for repeatedly generating bunches of ions. The ion pusher 21 comprises ion accelerating means for causing at least some of these bunches to enter the drift region with substantially the same component of kinetic energy along the axis 25 (which is perpendicular to the ion axis 11). This arrangement therefore comprises an orthogonal acceleration time-of-flight analyzer, but a linear arrangement is also within the scope of the invention. The ions leaving the ion pusher 21 travel into the drift region 24 along a trajectory 23,(which deviates from the axis 25 because the ions have a finite component of velocity in the direction of the ion axis 11), and become separated in time according to their mass to charge ratios. The drift region 24 is a reflecting type analyzer and comprises an electrostatic ion mirror 26 which changes the direction of travel of the ions following trajectory 23 and directs them into an ion detector 27. Use of the ion mirror 26 both decreases the size of the spectrometer and improves mass resolution but a linear analyzer could be used if desired.

Signal processing means 28 and 29 are connected to the collection electrodes in the detector 27 (described below) and their digital outputs are connected to a digital memory means 30. A digital computer 31 controls the signal processing means 28 and 29 and also the pulse generator 22 which controls the generation of ion bunches. Computer 30 is programmed to cause the pulse generator 22 to repetitively generate bunches of ions and to record the data generated by the signal processing means 28 and 29 for each bunch in the digital memory means 30, which typically comprises fast RAM. In the case of an analogue signal processing means, the digital output is recorded at a series of transit times relative to the time of generation of the ion bunch until all the ions of interest have entered the detector.

For maximum economy of memory usage a portion of memory is set aside for storing the digital output at each of the series of transit times for one ion bunch. The values of the digital output at transit times for subsequent ion bunches are then added to the previously stored values at corresponding transit times in order to produce an averaged value at each transit time taken over the whole series of ion bunches. In the case of pulse-counting signal processing means, computer 30 is programmed to store the time at which an ion bunch is generated and the times at which ion arrivals at the detector triggers the signal processing means, which typically occurs only once for each ion bunch. This is more efficient than storing a boolean value representing the output of a pulse-counting system at each of the transit times at which the output of an analogue signal processing means has to be sampled, but the latter method is within the scope of the invention.

During this data acquisition phase the computer 31 merely causes data to be stored in the memory means 30, and does not need to examine that data in any way. Similarly, no additional hardware responsive to the output of the signal processing means is required for the proper operation of the detector 27.

Once the data from a desired number of ion bunches has been stored in the memory means, the digital computer 31 may access this data and copy it to a disk for subsequent processing, or may carry out that processing in real time, thereby freeing the digital memory 30 to receive data from the next series of ion bunches. During the subsequent processing the computer 31 determines the quantity of ions which entered the detector at each transit time while the ion bunches were generated using the data associated with the second collection electrode, except as provided for below. Computer 31 further applies tests to the data to establish whether data from the second collection electrode is valid, and if not, uses data from the first collection electrode alone.

When data from the first collection electrode is used it is multiplied by a factor equal to the ratio of the effective areas (defined above) of the collection electrodes to make it compatible with that from the second collection electrode.

Unfortunately, a decision on whether data from the second collection electrode is reliable at any given transit time cannot be made directly on the basis of the observed ion arrival rate at that electrode because the observed rate may be affected by deadtime. For example, the observed rate may fall to zero in the case of an extending deadtime detector subject to a high ion arrival rate. Instead, data from the first collection electrode (which has been stored in the memory means) at the relevant transit times may be used to predict the ion arrival rate at the second electrode, and hence whether data associated with the second electrode is likely to be unreliable. Alternatively, data associated with the second collection electrode may be corrected step-by-step for the effects of deadtime, starting at the beginning of a peak. The magnitude of the correction so generated may then indicate that the ion arrival rate at the electrode later in the peak would be so great that adequate correction would be impossible, in which case data from the first collection electrode alone should be used to characterise the entire peak.

Figure 2:
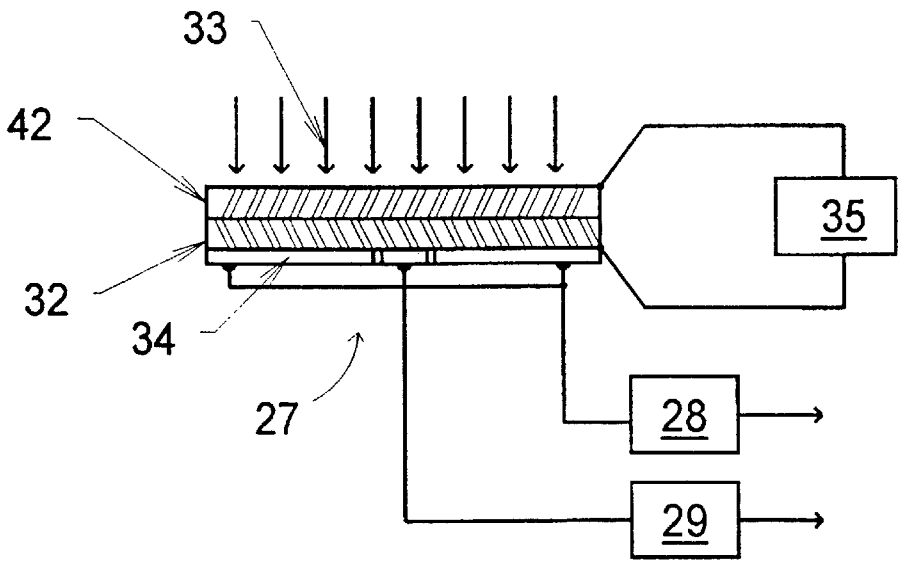
FIG. 2 is a drawing of an ion detector suitable for is use in the invention.
Figure 3:
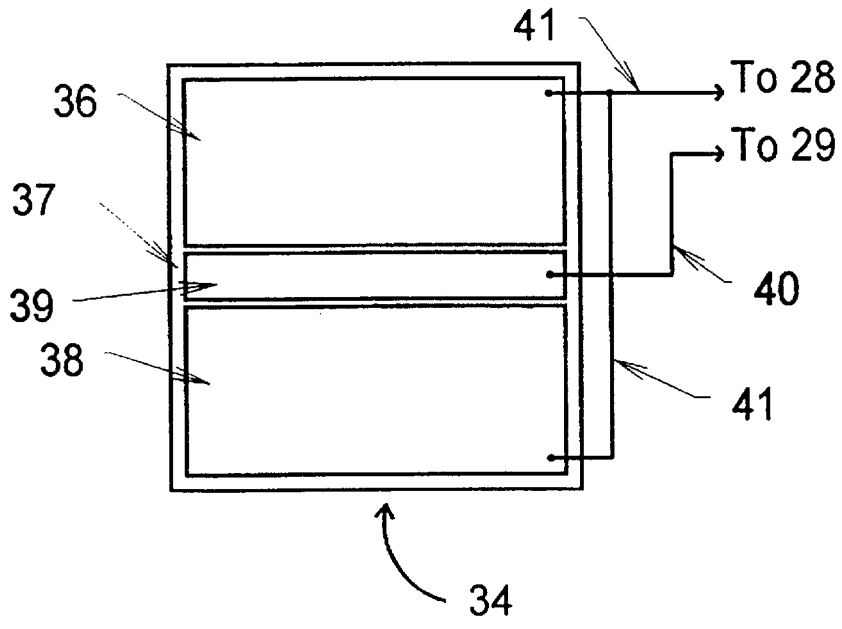
FIG. 3 is a drawing of an array of collection electrodes suitable for use in the detector shown in FIG. 2.

Referring next to FIG. 2, an embodiment of an ion detector suitable for use in the invention comprises a pair of microchannel plate electron multipliers 42, 32 disposed to receive ions directed towards the detector 27 by the ion mirror 26 (FIG. 1). The ion flux is schematically illustrated in FIG. 2 by the arrows 33. Each ion strikes the front surface of the multiplier plate 42 causing the release of a burst of electrons at its rear surface corresponding to the ion impact. These electrons are received by the front face of the second multiplier plate 32 so that a larger burst of electrons is generated at its rear face. These impact on a collection electrode array 34 and cause signals to be generated by the signal processing means 28, 29 which are connected to the electrodes in the array 34. A power supply 35 maintains a potential difference of approximately 2 kV between the faces of the multiplier plates 42 and 32 as required for their proper operation. A collection electrode array 34 suitable for use in the detector illustrated in FIG. 2 is shown in FIG. 3. It comprises an insulated substrate 37, typically of ceramic, on which are coated three electrically conductive electrodes 36, 38, and 39. Two of these electrodes, 36 and 38, are connected by the lead 41 and function as a single electrode of area approximately 8 times that of the smaller electrode 39. Lead 41 also connects the larger (second) composite electrode 36, 38 to a signal processing means 28, and the lead 40 connects the smaller (first) electrode to a signal processing means 29. This arrangement of electrodes compensates for an inhomogeneous distribution of ion flux represented by the arrows 33, at least along an axis parallel to the long dimension of the electrode 39, but other arrangements of electrodes are within the scope of the invention.

Figure 4:
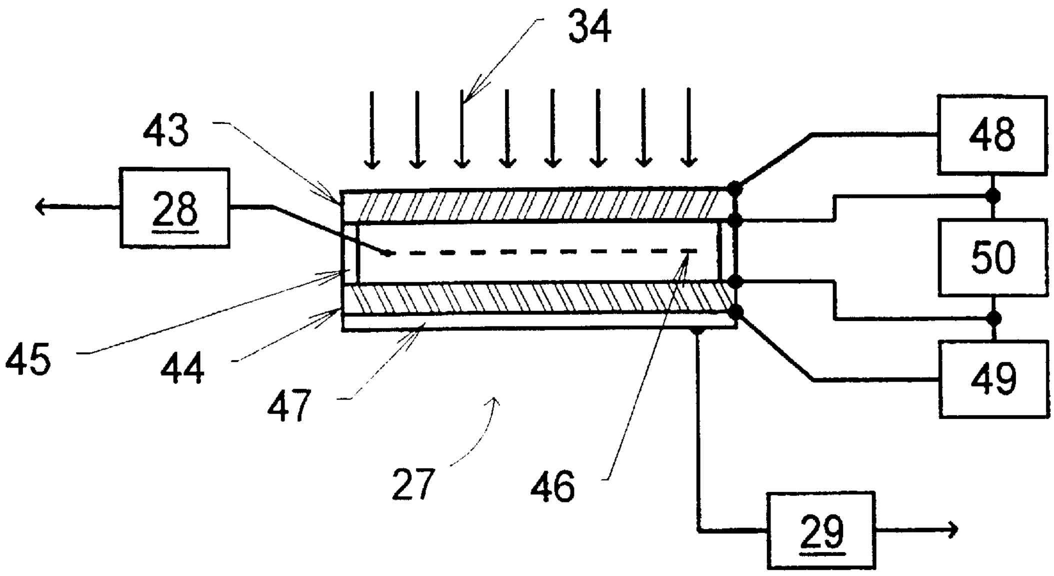
FIG. 4 is a drawing of an alternative type of ion detector.

An alternative embodiment of an ion detector 27 suitable for use with the invention is shown in FIG. 4. It comprises first and second electron multiplying means 43, 44, each of which comprises a microchannel plate electron multiplier. The channelplates are spaced apart by a series of insulators 45 which also supports a first collection electrode 46. Electrode 46 comprises a grid having a transparency of about 50% so that it collects approximately half of the electrons leaving the first multiplying means 43 and transmits the remainder to the second electron multiplying means 44. A second collection electrode 47 is disposed to receive electrons leaving the second electron multiplying means 44. Power supplies 48 and 49 maintain a potential difference of about 1 kV across each of the channelplates. A third power supply 50 maintains a potential difference of about 200 volts between the rear face of channelplate 43 and the front face of channelplate 44 to ensure electrons are efficiently transmitted between the two.

As in the FIG. 2 embodiment, signal processing means 28 and 29 are connected to the first and second collection electrodes 46 and 47 respectively. In a detector of this type, low-gain signals and high-gain signals are available at the collection electrodes 46 and 47 respectively. These signals correspond to the signals at the small and large area collection electrodes 39 and 36, 38 of the detector shown in FIG. 2.

A disadvantage of the ion detector shown in FIG. 4 is that the effective area of the grid electrode is strongly dependent on the threshold setting of the discriminator 28. For the grid electrode the amplitude of the current pulses produced extends over a greater range than those produced by the plate-like electrode 47, presumably because electrons passing close to the wires comprising the grid but not actually striking a wire induce a signal in the electrode which is smaller than the minimum signal which would be produced by impact of those electrons on a solid electrode. This effect becomes more pronounced as the number of wires comprised in the grid is increased. While it has the effect of allowing the effective area of the grid to be varied by adjusting the threshold of the discriminator 28, it is more difficult to maintain the ratio of the effective areas of the grid electrode 46 and the plate electrode 47 at a constant value. Consequently, in a more preferred (unillustrated) embodiment of the ion detector the grid electrode 46 (FIG. 4) may be replaced by a single wire stretched across the electrode 47 between the two insulators 45. Typically a wire 0.5 mm diameter can be used. The range of pulse amplitudes produced by such an electrode is smaller than that produced by a grid electrode but still greater than that produced by the plate electrode, which provides adequate stability of the ratio of the effective areas while allowing some adjustment of that ratio by alteration of the threshold level of the discriminator 28. Because of this "induction" effect the effective area of the wire is considerably greater than its actual area.

What is claimed is:

1. A time-of-flight mass spectrometer comprising:

an ion source (1–24) for repetitively generating bunches of ions from a sample to be analyzed;

ion accelerating means (21) for causing at least some of the ions comprised in each of said bunches to enter a drift region (24) along an axis (25) with substantially the same component of kinetic energy along said axis (25), in which drift region (24) they become separated in time according to their mass-to-charge ratios; and an ion detector (27) disposed to receive ions after they have passed through said drift region (24);

characterized in that:

said ion detector comprises:

at least one electron multiplying means (42,32) for producing secondary electrons in response to an ion entering said ion detector (27);

a first collection electrode (39) for receiving some of said secondary electrons; and a second collection electrode (36,38) for receiving others of said secondary electrons or other electrons derived from those electrons, said second collection electrode (36,38) receiving in use more electrons in response to an ion entering said ion detector (27) than said first collection electrode (39), each said collection electrode (36,38;39) having associated therewith a separate signal processing means (28,29) which has a digital output;

said mass spectrometer further comprising:

digital memory means (30) for storing the digital outputs of each of said signal processing means (28,29) at one or more transit times of said ions through said drift region (24) relative to the generation of a said bunch of ions; and output means (31) for accessing the data stored in said digital memory means (30) after all the ions of interest generated in one or more of said bunches have entered said ion detector (27), and retrospectively determining the quantity of ions which entered said ion detector (27) at one or more of said transit times while said ion bunches were being generated.

2. A time-of-flight mass spectrometer as claimed in claim 1, wherein said first collection electrode (39) has a smaller effective area than said second collection electrode (36,38).

3. A time-of-flight mass spectrometer as claimed in claim 1, wherein a second electron multiplying means (44) is provided between said first collection electrode (46) and said second collection electrode (47), wherein said second electron multiplying means (44) receives in use electrons which are not collected on said first collection electrode (46) and further multiplies them so that more electrons per ion entering said ion detector (27) reach said second collection electrode (47) than reach said first collection electrode (46).

4. A time-of-flight mass spectrometer as claimed in claim 1, wherein said first collection electrode (46) comprises at least one grid electrode (46).

5. A time-of-flight mass spectrometer as claimed in claim 1, wherein said first collection electrode (46) comprises at least one wire electrode (46).

6. A time-of-flight mass spectrometer as claimed in claim 1, wherein both said first (39) and said second (36,38) collection electrodes are plate-like electrodes.

7. A time-of-flight mass spectrometer as claimed in claim 1, wherein at least one of said signal processing means (28,29) comprises an analogue signal processing means.

8. A time-of-flight mass spectrometer as claimed in claim 7, wherein said analogue signal processing means comprises a fast analogue amplifier followed by an analogue to digital converter which outputs a digital signal to said digital memory means (30) on receipt of a clock pulse.

9. A time-of-flight mass spectrometer as claimed in claim 1, wherein said signal processing means (28, 29) associated with each of the collection electrodes (36,38;39) comprises digital pulse-counting signal processing means.

10. A time-of-flight mass spectrometer as claimed in claim 9, wherein said digital pulse-counting signal processing means comprises a discriminator which provides a digital signal to said digital memory means (30) in response to the arrival of secondary electrons at said collection electrode (36,38;39) in the period immediately preceding a clock pulse.

11. A time-of-flight mass spectrometer as claimed in claim 1, wherein at any given transit time said output means (31) in a first mode of operation uses data associated with at least said second collection electrode (36,38) and in a second mode of operation uses data associated with said first collection electrode (39) only, said output means (31) switching from said first mode to said second mode if the data from the second collection electrode (36,38) is deemed to be unreliable.

12. A time-of-flight mass spectrometer as claimed in claim 11, wherein in said first mode of operation data associated with said first collection electrode (39) is used in addition to data associated with said second collection electrode (36,38).

13. A time-of-flight mass spectrometer as claimed in claim 11, wherein the data from said second collection electrode (36,38) is deemed to be unreliable if the ion arrival rate at said ion detector (27) exceeds a predetermined level.

14. A time-of-flight mass spectrometer as claimed in claim 13, wherein the ion arrival rate at said ion detector (27) is determined from data associated with said first collection electrode (39) only.

15. A time-of-flight mass spectrometer as claimed in claim 13, wherein the ion arrival rate at said ion detector (27) is determined from a deadtime-correction algorithm applied to data associated with said second collection electrode (36,38).

16. A method of time-of-flight mass spectrometry comprising the steps of:

repetitively generating bunches of ions from a sample to be analyzed;

accelerating at least some of the ions comprised in said bunches so that they have substantially the same kinetic energy along an axis (25) and allowing them to separate in time according to their mass-to-charge ratios during their subsequent passage through a drift region (24); and detecting with an ion detector (27) said ions after they have passed through said drift region (24);

said method characterized in that:

the step of detecting said ions comprises:

generating a plurality of secondary electrons from at least some of the ions entering said ion detector (27);

collecting some of said secondary electrons on a first collection electrode (39);

collecting others of said secondary electrons or electrons derived from these electrons on a second collection electrode (36,38), whereby said second collection electrode (36,38) receives more electrons per ion entering said detector (27) than said first collection electrode (39); and separately generating digital signals representative of the number of electrons arriving at each said collection electrode (36,38;39);

said method further comprising the steps of:

storing said digital signals in digital memory means (30) at one or more transit times of said ions through said drift region (24) relative to the generation of a said bunch of ions; and after all of the ions of interest generated in one or more of said bunches have travelled through said drift region (24), accessing the data stored in said digital memory means (30) and retrospectively determining the quantity of ions which were detected at one or more of said transit times while said ion bunches were being generated.

17. A method of time-of-flight mass spectrometry as claimed in claim 16, further comprising the steps of:

using, at any given transit time, data associated with at least said second collection electrode (36,38) in a first mode of operation;

using, at any given transit time, data associated with said first collection electrode (39) only in a second mode of operation; and switching from said first mode to said second mode if the data from the second collection electrode (36,38) is deemed to be unreliable.

18. A method of time-of-flight mass spectrometry as claimed in claim 17, further comprising the step of using in said first mode of operation data associated with said first collection electrode (39) in addition to data associated with said second collection electrode (36,38).

19. A method of time-of-flight mass spectrometry as claimed in claim 17, further comprising the step of deeming the data from said second collection electrode (36,38) to be unreliable if the ion arrival rate at said ion detector (27) exceeds a predetermined level.

20. A time-of-flight mass spectrometer as claimed in claim 19, further comprising the step of determining the ion arrival rate at said ion detector (27) from data associated with said first collection electrode (39) only.

21. A time-of-flight mass spectrometer as claimed in claim 19, further comprising the step of determining the ion arrival rate at said ion detector (27) from a deadtime-correction algorithm applied to data associated with said second collection electrode (36,38).

* * * * *